Nov. 24, 1925.                                                    1,562,740
J. E. BURNHAM ET AL
DIRECTION INDICATING SIGNAL FOR VEHICLES
Filed Aug. 6, 1923          2 Sheets-Sheet 1
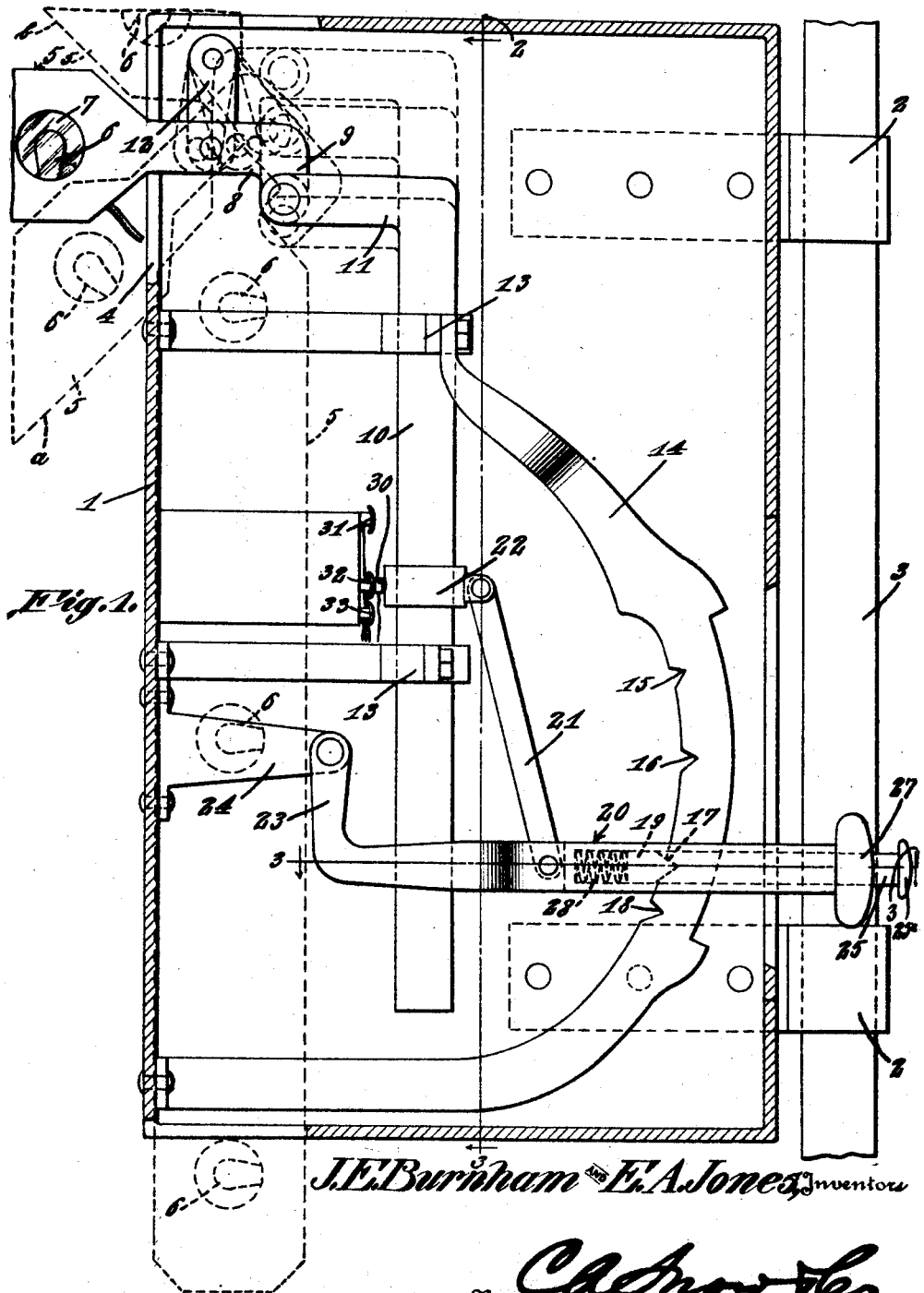
J.E.Burnham and F.A.Jones, Inventors
By C.A.Snow & Co.
Attorneys Nov. 24, 1925.  
J. E. BURNHAM ET AL  
1,562,740  
DIRECTION INDICATING SIGNAL FOR VEHICLES  
Filed Aug. 6, 1923   2 Sheets-Sheet 2

J.E.Burnham and F.A.Jones, Inventors

Patented Nov. 24, 1925.

1,562,740

UNITED STATES PATENT OFFICE.

JAMES E. BURNHAM AND EDWIN ALLEN JONES, OF POMONA, CALIFORNIA.

DIRECTION-INDICATING SIGNAL FOR VEHICLES.

Application filed August 6, 1923. Serial No. 656,050.

*To all whom it may concern:*

Be it known that we, JAMES E. BURNHAM and EDWIN ALLEN JONES, citizens of the United States, residing at Pomona, in the county of Los Angeles and State of California, have invented a new and useful Direction-Indicating Signal for Vehicles, of which the following is a specification.

This invention relates to motor vehicle signals and more particularly to direction indicators.

The main object of the invention is to provide a direction indicator for vehicles to indicate to pedestrians and drivers of other vehicles the direction in which the machine is going to turn.

Another object is to provide a signal of this character which will be visible by day and by night from both front and rear and not subject to weather conditions.

Another object is to so construct such a device that it will indicate simultaneously to both the eye and the ear that the vehicle giving the signal intends to change its course.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a longitudinal vertical section through the casing in which the signal operating means are located, said means being shown in side elevation.

Figure 3:
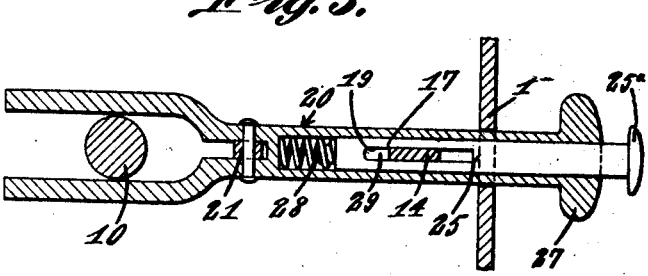
Fig. 3 is a horizontal section taken on the line 3—3 of Fig. 1.
Figure 2:
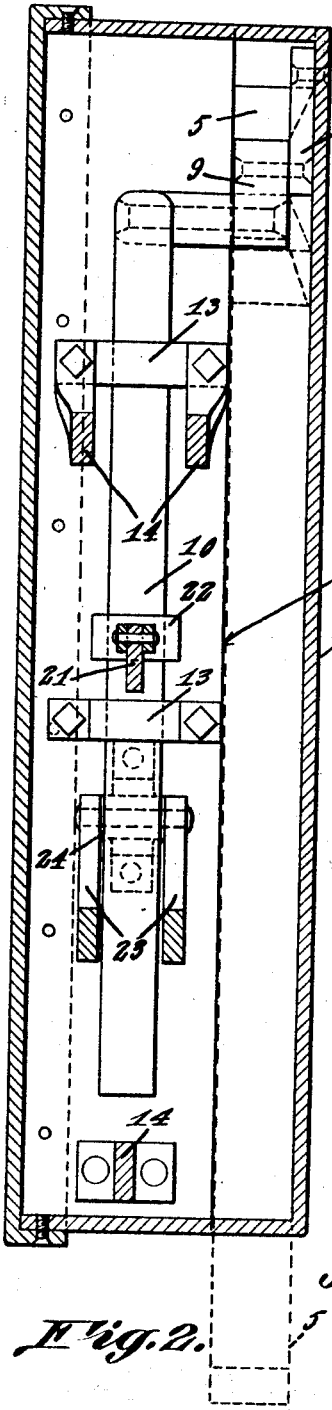
Fig. 2 is a section taken on the line 2—2 of Fig. 1.

In the embodiment illustrated a casing 1 is shown composed of any suitable material preferably sheet metal and which is designed to be secured by clips 2 to one of the side rods 3 of the wind shield of an automobile in which position it is conveniently located for use by the driver.

A movable signaling arm 5 is pivotally mounted in the casing 1 and designed to operate through an opening 4 in the side wall of said casing, said arm being designed to indicate a change in course of the vehicle. This arm 5 is made hollow and has mounted therein electric light bulbs as 6 any desired number of which may be employed and over which are arranged transparent coverings as 7 on both sides so that the light may be visible from in front and rear. These coverings may be colored any suitable color red being preferably used although obviously this is not necessary. In the form here shown three of these lights are illustrated. (See dotted lines of Fig. 1.) The arm 5 is of a length sufficient to permit it when swung downward to its extreme lower position to project at its free end beyond the lower end of the casing so that the light carried by this end will be visible, and operate as a telltale to indicate whether or not the tail light is burning, the circuit of the bulbs 6 being connected with that of the tail light.

The arm 5 is provided at its inner end with a reduced neck or stem 8 having a laterally extending finger 9 at its free end which is pivotally connected with a laterally extending arm 11 of a sliding rod 10 hereinafter to be described. The neck 8 of the arm 5 is mounted between links as 12 supported by the casing 1 and pivotally connected with said neck 8 which permits the arm 5 to swing thereon as a fulcrum, said arm being actuated by the sliding rod 10 which is controlled by a lever 20 operated by the driver.

The rod 10 is mounted to reciprocate in suitable bearings 13 supported in the casing 1, one of which also supports one end of an arcuate rack 14 the other end being riveted or otherwise secured to the casing 1 as is shown clearly in Fig. 1. This rack 14 is provided on its inner edge with a plurality of notches 15, 16, 17 and 18 with which are designed to cooperate a spring pressed pawl 19 carried by the lever 20 and which when engaged with one of the notches holds the lever in adjusted position and also the rod 10 with which it is connected by means of a pitman 21 pivoted at one end to the lever and at its other end with a collar 22 fixedly secured on the rod 10 so that the shifting of the lever will operate to reciprocate the rod and swing the arm 5 into the desired position. When the pawl 19 of lever 20 is engaged with notch 15 the rod 10 will be moved upwardly a sufficient distance to swing the arm 5 downward into the dotted line position shown in Fig. 1 with the light 6 located below the casing and when this arm is in this position it will be out of use and may be termed as neutral. When the lever is swung to bring the pawl into engagement with the notch 16 the rod 10 will be moved downwardly a sufficient distance into oblique position shown at *a* in Fig. 1, and the position of the arm is intended to indicate that the vehicle carrying it is to slow down or stop. The movement of lever 20 to bring the pawl 19 into engagement with notch 17 lowers rod 10 sufficiently to swing the arm 5 laterally out at right angles as shown in full lines in Fig. 1 and which position indicates that the vehicle is going to turn to the left.

The movement of lever 20 to bring the pawl 19 into engagement with the lowermost notch 18 will operate to swing the arm 5 upward at an oblique angle as shown in dotted lines in Fig. 1 and marked *b*. This position of the arm indicates that the vehicle is going to turn to the right.

The lever 20 extends through an opening in the inner wall of the casing 1 and has a laterally extending arm 23 at its inner end which is fulcrumed at its terminal on a bracket 24 carried by the wall of the casing. This lever 20 is bifurcated at its inner end to straddle the rod 10 and the outer portion thereof is made hollow for the mounting therein of a plunger 25 designed to engage the pawl 19 which projects through registering openings 29 in the plunger 25 and a similar opening in the lever, not show. This plunger 25 extends out through the outer end of lever 20 and is equipped with a button 25ª mounted to reciprocate in a knob 27 on the end of lever 20 to facilitate the operation of the plunger by the driver, the knob 27 acting as a handle for the lever. A coiled spring 28 exerts its tension to normally project the plunger 25 and pawl 19. As shown the spring 28 engages the plunger 25 which has a slot 29 in which is located the pawl 19 so that the reciprocation of the plunger will operate to project or retract the pawl.

From the above description it will be obvious that when the driver desires to change the course of his vehicle he will first depress button 25ª to disengage the pawl 19 from the notch of rack 14 in which it is located. Knob 27 is then grasped and the lever 20 is swung until the pawl engages the notch corresponding to the signal to be given. After the vehicle has changed its course the lever is disengaged from the notch and swung upwardly until the pawl 19 enters the notch 15 and positions the signal arm 5 in lowered neutral position.

Figure 4:
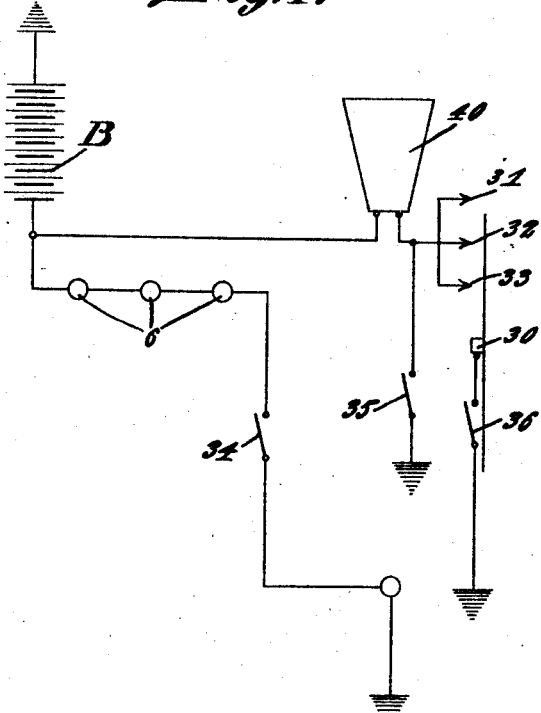
Fig. 4 is a diagram showing the electric circuits for the signal.

The collar 22 which is fixed to the rod 10 carries a contact 30 which is insulated therefrom and connected with a suitable source of electricity shown in Fig. 4 in the form of a battery B. This contact 30 is designed to pass cooperating contacts 31, 32 and 33 located in the circuit of the sound horn 40 and which are so positioned that when the pawl 19 enters notches 16, 17 or 18 the contact 30 will engage one of the contacts 31, 32 or 33, close the electric circuit and sound the horn. It will thus be seen that this arrangement provides for the simultaneous sounding of the horn with the actuation of the signal arm so that both pedestrians and drivers will be notified both by sight and hearing that the car carrying the signal intends to make a change in its course.

A switch 36 is arranged in the circuit having the contacts 31, 32 and 33 so that when desired they may be cut out and the signal arm operated without sounding the horn. Another switch 34 is located convenient to the driver's seat for cutting off current from the signal arm and from the tail light which is in the same circuit. The tail light being arranged in the circuit with the bulbs 6 enables the bulb at the free end of the arm 5 to be used as a telltale when the arm is in neutral position to show whether or not the tail light is lit.

The switch 35 is provided for sounding the horn when it is desired to use it without the lights.

From the above description it will be obvious that the casing 1 carrying the signaling apparatus may be easily applied to the wind shield frame 3 without marring the car in any way, said casing being comparatively small will not mar the appearance of the car all of the actuating parts being concealed except the outer end of the lever 20 and the arm 5.

Various changes in the form, shape, proportion and other minor details of construction may be made without departing from the principle or sacrificing any of the advantages of the claimed invention.

We claim:—

1. A device of the class described comprising a supporting structure, a signal arm mounted to swing thereon, an L-shaped member slidably mounted on said structure and pivotally connected by its short arm with said arm, a lever fulcrumed on said structure and connected to actuate said sliding member, a pawl carried by the lever and a rack by the structure for locking the lever in adjusted positions whereby the arm is held at the desired angle.

2. In a device of the class described, a supporting structure, a signal arm mounted to swing in said structure, a rod slidably mounted in said structure in a plane at right angles to said arm and having a laterally extending arm pivoted to said signal arm whereby the sliding of the rod will swing said arm, a lever fulcrumed in said structure, a link connecting said lever and rod at a point remote from the fulcrum of the lever whereby the swinging of the lever will slide the rod and actuate the signal arm, and means for locking the lever in adjusted positions.

3. In a device of the class described, a supporting structure, a signal arm mounted to swing in said structure and having a laterally extending finger, a rod slidably mounted in said structure and having a laterally extending arm pivoted to said finger whereby the sliding of the rod will swing said arm, a lever fulcrumed in said structure, a link connecting said lever and rod at a point remote from the fulcrum of the lever whereby the swinging of the lever will slide the rod and actuate the signal arm, means for locking the lever in adjusted positions, and means carried by said lever under the control of the driver for releasing said locking means.

4. In a device of the class described a supporting structure, a signal arm mounted to swing therein, an L-shaped sliding bar having its short arm pivoted to said arm, a lever fulcrumed on said structure and connected to actuate said sliding bar on the swinging of the lever, a rack mounted on said structure and having spaced notches, and a spring projected pawl carried by said lever to engage said notches and lock the lever in adjusted positions.

5. In a device of the class described a supporting structure, a signal arm mounted to swing therein, a sliding member connected to swing said arm, a lever fulcrumed on said structure and connected to actuate said sliding member on the swinging of the lever, a rack mounted on said structure and having spaced notches, a spring projected pawl carried by said lever to engage said notches and lock the lever in adjusted positions, and a plunger carried by the lever for releasing said pawl from said rack.

6. The combination of a signal arm fulcrumed near one end and having a laterally extending finger at its terminal, a sliding actuator pivoted to said finger, a lever fulcrumed to a support, a pitman connecting said lever and said sliding actuator, a spring pressed pawl for locking the lever in adjusted position, and a plunger carried by said lever and connected to release said pawl when desired.

In testimony that we claim the foregoing as our own, we have hereto affixed our signatures.

JAMES E. BURNHAM.
EDWIN ALLEN JONES.